United States Patent [19]

Warrin

[11] Patent Number: 5,640,522
[45] Date of Patent: Jun. 17, 1997

[54] METHOD AND SYSTEM FOR PREVIEWING TRANSITION EFFECTS BETWEEN PAIRS OF IMAGES

[75] Inventor: Paul Warrin, Sunnyvale, Calif.

[73] Assignee: Microsoft Corporation, Redmond, Wash.

[21] Appl. No.: 349,372

[22] Filed: Dec. 5, 1994

[51] Int. Cl.$^6$ .................................................. G06F 3/14
[52] U.S. Cl. .......................... 395/346; 395/334; 395/348; 395/135
[58] Field of Search ................................... 395/155, 157, 395/159, 154, 152, 161, 135, 334, 333, 346, 340, 342, 348–350, 326, 173, 174, 960; 345/119, 115

[56] References Cited

U.S. PATENT DOCUMENTS

| | | | |
|---|---|---|---|
| 5,206,929 | 4/1993 | Longford et al. | 395/159 |
| 5,353,391 | 10/1994 | Cohen et al. | 395/161 X |
| 5,359,712 | 10/1994 | Cohen et al. | 395/161 |
| 5,363,482 | 11/1994 | Victor et al. | 395/157 |
| 5,414,808 | 5/1995 | Williams | 395/154 |
| 5,416,900 | 5/1995 | Blanchard et al. | 395/155 |
| 5,491,778 | 2/1996 | Gordon et al. | 395/152 X |
| 5,500,936 | 3/1996 | Allen et al. | 395/157 X |

OTHER PUBLICATIONS

"Special Delivery Reference Manual", Interactive Media Corporation, 1992, pp. 25, 65, 67.

*Primary Examiner*—Raymond J. Bayerl
*Attorney, Agent, or Firm*—Seed and Berry LLP

[57] ABSTRACT

A method and system for previewing transition effects between pairs of images is provided. In a preferred embodiment, a transition effect previewing program ("the previewing program") enables a user to preview a transition effect assigned to a pair of images within a presentation. The previewing program first displays in a display area both the source image and the target image. When the previewing program receives a previewing instruction from the user, the previewing program displays the source image in a preview position in the display area. The previewing program then applies the assigned transition effect to the source image displayed in the preview position in the preview area. In a further improved embodiment, the preview position corresponds to the position in which the target image is first displayed. In yet further preferred embodiments, the user may issue a previewing instruction by assigning a transition effect to a pair of images, or by selecting a transition effect indicator displayed in conjunction with a pair of images to which a transition effect has already been assigned.

19 Claims, 14 Drawing Sheets

METHOD AND SYSTEM FOR PREVIEWING TRANSITION EFFECTS BETWEEN PAIRS OF IMAGES

TECHNICAL FIELD

The invention relates generally to a method and system for designing visual presentations comprised of a series of images, and, more specifically, to a method and system for previewing transition effects between pairs of images.

BACKGROUND OF THE INVENTION

Modern presentation computer programs ("presentation programs") allow human users to use a general-purpose computer and an attached display device to design and present a slide show-type visual presentation ("presentation") comprised of a sequence of visual ("images"), or "slides." Typically, such presentation programs have a presentation editing mode in which users may design and revise presentations and a presentation mode in which users may present presentations. Presentation programs are useful because they enable a user who is not a graphic design artist to design a consistent, professional-looking visual presentation that can accompany and enhance a verbal presentation.

A user designs a presentation by interacting with the presentation program to prepare a set of images to be presented during the presentation. It is typical for the user to designate a particular linear sequence for the images to presented in during the presentation. This can be characterized as creating a "link" from each image to the image that follows it in the sequence designated by the user. When the presentation is initiated, the images are presented in the designated sequence. From a particular current image being displayed, the presentation program presents the next image in the designated sequence, following the link from the current image, either (a) after a designated period of time has passed since the current image was presented or (b) when the user operates a "next image" control.

In some presentation programs, the visual transition from a current image to the image that follows it in the designated sequence (or "next image") is arbitrary. For example, often each row of pixels of the current image is replaced with the corresponding row of pixels of the next image, from top to bottom, as quickly as possible. Other presentation programs utilize a more sophisticated approach, according to which the user may designate that transitions between adjacent images are to be performed using special "transition effects". A transition effect is a graphical technique for visually depicting the transition from a source image to a target image. Transition effects generally involve either: (1) replacing portions of the current image with the corresponding portions of the next image according to some pattern, e.g., a checkerboard pattern; (2) progressively shifting one of the two images relative to the other, e.g., shifting the current image progressively to the right to reveal the next image "underneath"; or (3) manipulating brightness values in the palette used to display the images, e.g., making the current image appear to recede into darkness, then making the next image appear to emerge from darkness.

Some presentation programs allow the user to view demonstrations of different transition effects when the user is selecting a transition effect for a particular pair of images. Such demonstrations are performed using a "sample" current image and a "sample" next image. While such demonstrations may help the user to appreciate the general nature of different transition effects, the use of standard sample images makes it difficult to determine how the transition effect will look when applied to a particular pair of the actual images used in a presentation.

Typically, the user cannot assess the effect of assigning a particular transition effect to a particular pair of images used in a presentation without using the presentation mode of the presentation program to view the entire presentation at full size. This can be inconvenient, especially in cases where the user is experimenting with different transition effects for a particular pair of images.

SUMMARY OF THE INVENTION

The invention provides a method and system for previewing transition effects between pairs of images. In a preferred embodiment, a transition effect previewing program ("the previewing program") enables a user to preview a transition effect assigned to a pair of images within a presentation. The previewing program first displays in a display area both the source image and the target image. When the previewing program receives a previewing instruction from the user, the previewing program displays the source image in a preview position in the display area. The previewing program then applies the assigned transition effect to the source image displayed in the preview position in the preview area. In a further improved embodiment, the preview position corresponds to the position in which the target image is first displayed. In yet further preferred embodiments, the user may issue a previewing instruction by assigning a transition effect to a pair of images, or by selecting a transition effect indicator displayed in conjunction with a pair of images to which a transition effect has already been assigned.

BRIEF DESCRIPTION OF THE DRAWINGS

FIGS. 2A–2J are screen diagrams demonstrating the operation of the preview program.

DETAILED DESCRIPTION OF THE INVENTION

A method and system for previewing transition effects between pairs of images is provided. In a preferred embodiment, a transition effect previewing program ("the previewing program") enables a user to preview a transition effect assigned to a pair of images within a presentation, which preferably comprises an ordered sequence of images. A transition effect is a graphical technique for visually depicting the transition from a source image to a target image, and is preferably defined by a subroutine or set of parameters stored in conjunction with the previewing program that specifies how the transition effect is to be performed. The previewing program preferably has a presentation editing mode, in which several of the images of the presentation are displayed simultaneously at a size smaller than that at which they will be displayed during the presentation. In the presentation editing mode, the previewing program preferably enables the user to apply any of a number of available transition effects to a pair of images that is adjacent in the sequence of the presentation by selecting a pair of images and selecting a transition effect to apply to the selected pair of images. When a user applies a transition effect to a pair of images, the previewing program preferably previews the assigned transition effect by replacing the target image of the selected pair with the source image of the selected pair, then applying the transition effect to that source image in order to visually transform it back into the target image. After the user has assigned a presentation effect to a pair of images, the previewing program displays a transition effect indicator, such as a small icon, in conjunction with a pair of images in the presentation editing mode. The user may preferably also preview any transition effect assigned to a pair of images by using a pointing device to select the transition effect indication displayed in conjunction with the pair of images.

Figure 1:
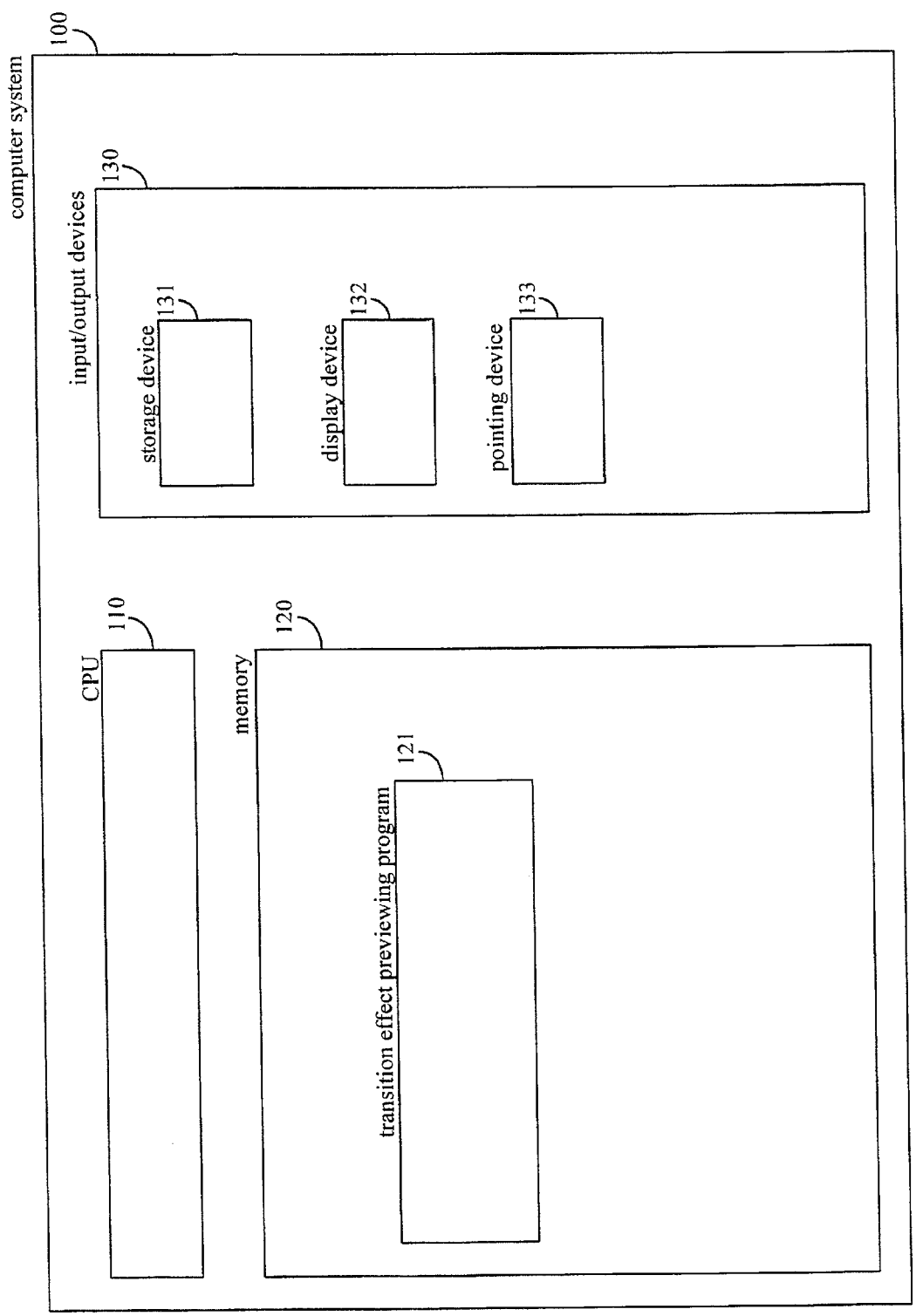
FIG. 1 is a high-level block diagram of the general-purpose computer system upon which the previewing program preferably operates.

FIG. 1 is a high-level block diagram of the general-purpose computer system upon which the previewing program preferably operates. The computer system 100 contains a central processing unit (CPU) 110, input/output devices 120, and a computer memory (memory) 130. Among the input/output devices 120 are a storage device 121, such as a hard disk drive; a display device 132, such as a video monitor; and a pointing input device ("pointing device") 133, such as a mouse. The previewing program 121 preferably resides in the memory 130 and executes on the CPU 110. While the previewing program is preferably implemented on a computer system configured as described above, one skilled in the art will recognize that it may also be implemented on computer systems having different configurations.

FIGS. 2A–2J are screen diagrams demonstrating the operation of the previewing program. These diagrams show the user interacting with the previewing program in its presentation editing mode. The user first assigns a particular transition effect to a pair of images, to which the presentation program responds by previewing the assigned transition effect (FIGS. 2A–2E). The user then previews a different presentation effect by selecting a visual presentation effect indication displayed in conjunction with another pair of images (FIGS. 2F–2J).

Figure 2A:
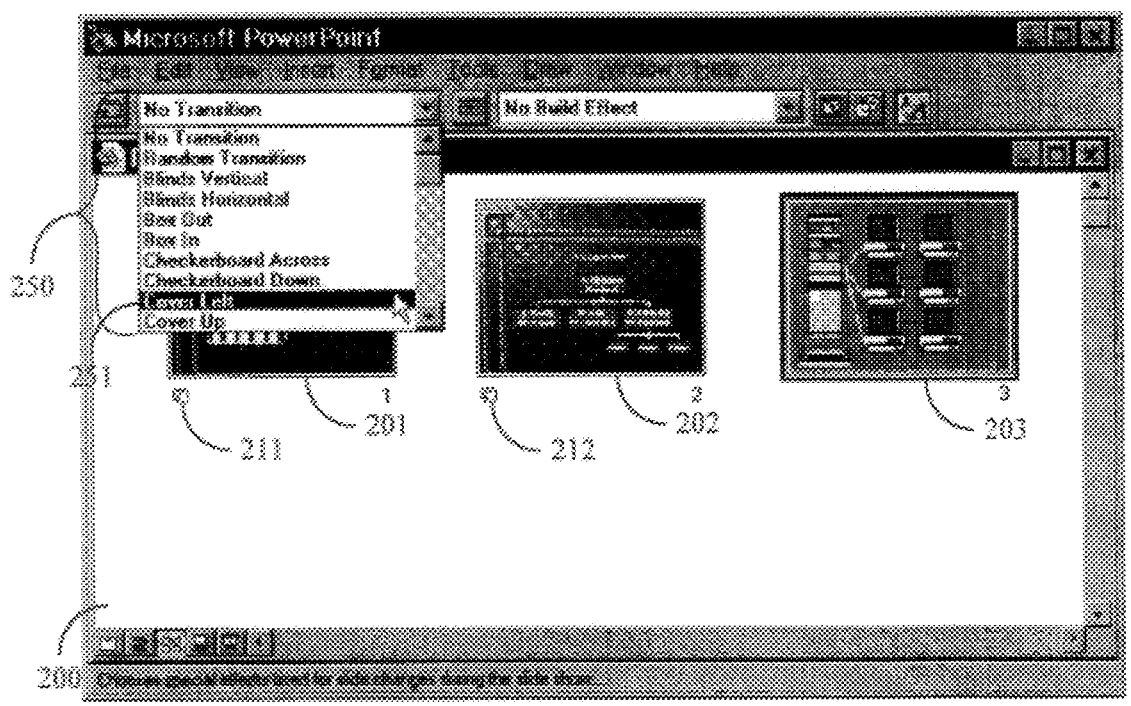

FIG. 2A shows the output displayed by the previewing program in its presentation editing mode. A display area 200 contains three images, 201, 202, 203, that comprise a sample presentation. These images are arranged in a presentation sequence from left to right, so that image 201 is the first image, which is followed in the sequence by the second image, 202, which is followed in the sequence by the third image, 203. While three images are shown here to facilitate the discussion of the invention, many actual presentations are comprised of a much larger number of images. Displayed beneath two of the images, 201 and 202, are transition effect icons 211 and 212, respectively. As described in greater detail below, the user is able to use these transition effect icons to preview transition effects. More generally, the previewing program provides visual indications that transition effects are assigned to particular groups of images which may be used to preview transition effects. In each case, the display of the transition effect icon indicates that a particular transition effect has been assigned to the pair of images comprising the image that the transition effect icon is displayed beneath and the image that immediately precedes the image that the transition effect icon is displayed beneath. For instance, transition effect icon 212 indicates that a transition effect has been assigned to a pair of images comprising image 201 and image 202. In the case of the first image 201, the display of the transition effect icon 211 indicates that the pair of images comprising image 201 and a zeroeth, or null, image, which is preferably a solid black rectangle (not shown).

In FIG. 2A, the user is assigning a presentation effect to the pair of images comprising image 202 and 203. The user first selected image 203 by using the mouse to click on a position inside it. The fact that image 203 has been selected is indicated by a dark border surrounding image 203. The user then selects a particular transition effect from a drop-down list box control 250. The user selects a "Cover Left" transition effect 251. By selecting the "Cover Left" transition effect while image 203 is selected, the user assigns the "Cover Left" transition effect to the pair of images comprising image 203 and the image that precedes it, image 202.

Figure 2B:
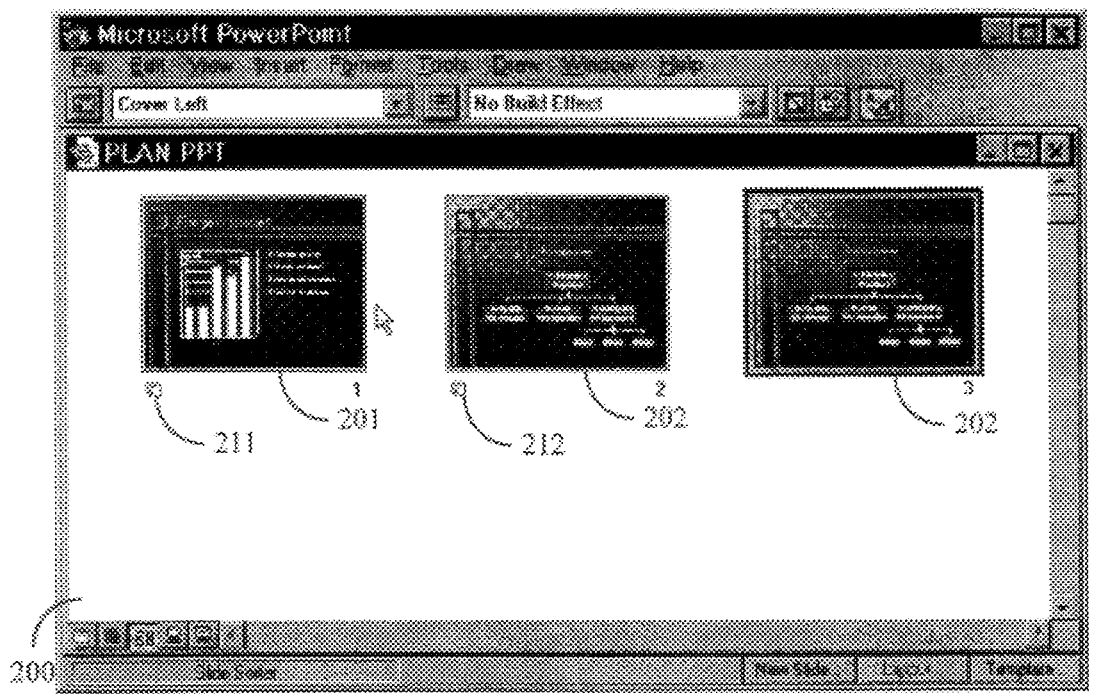
Figure 2C:
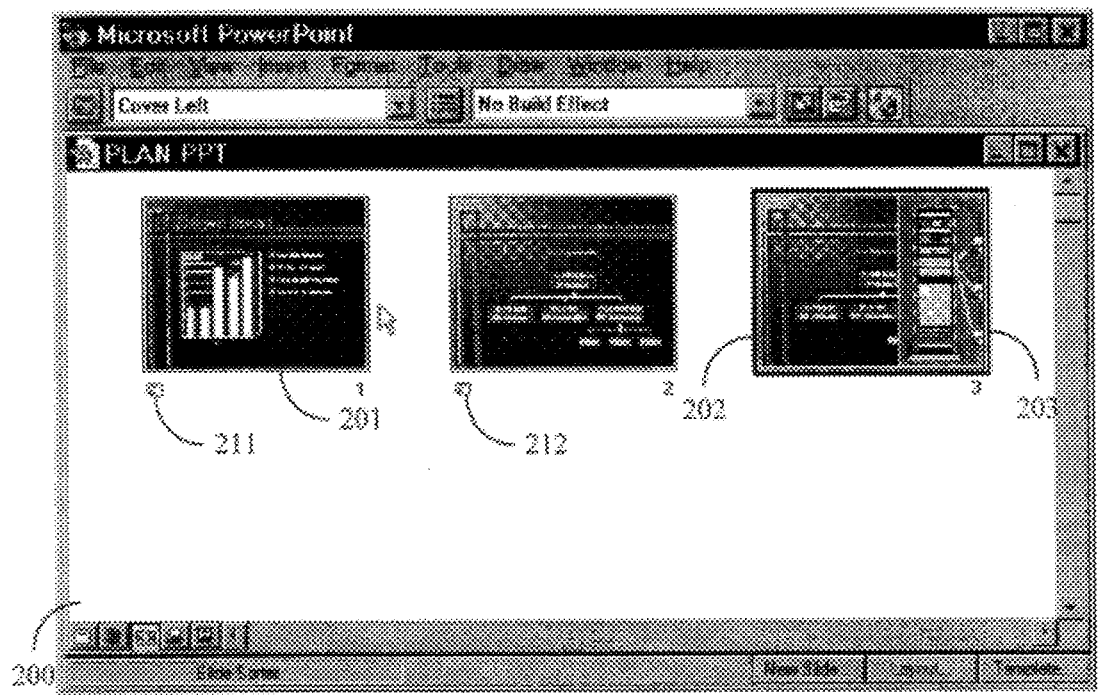
Figure 2D:
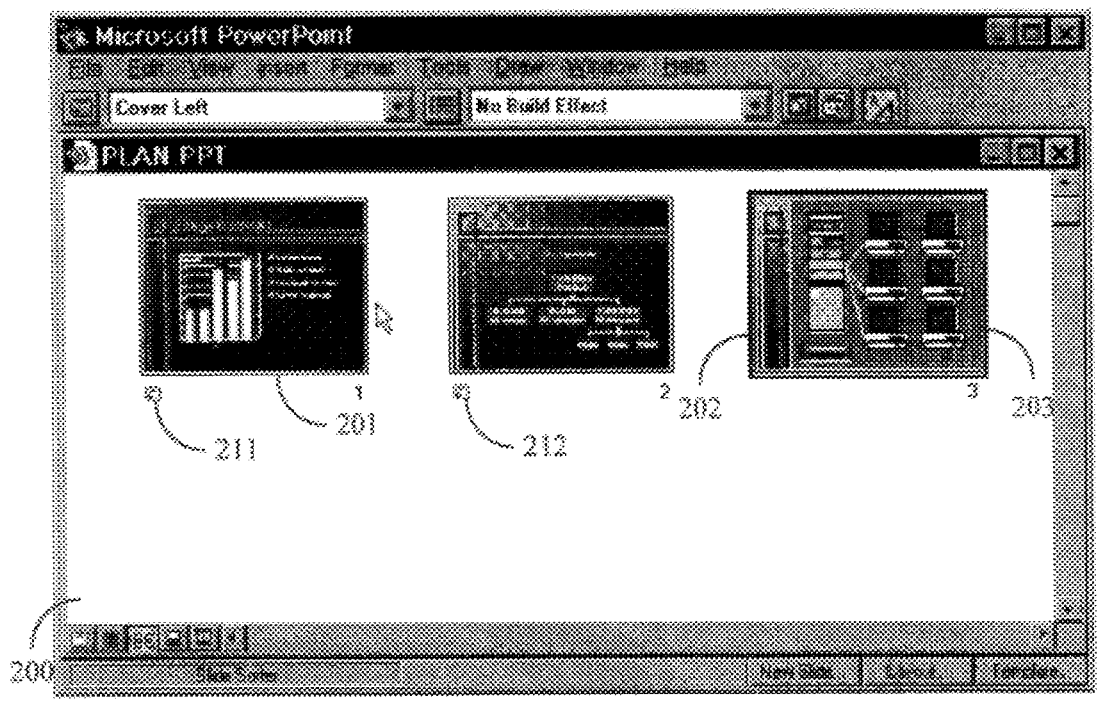
Figure 2E:
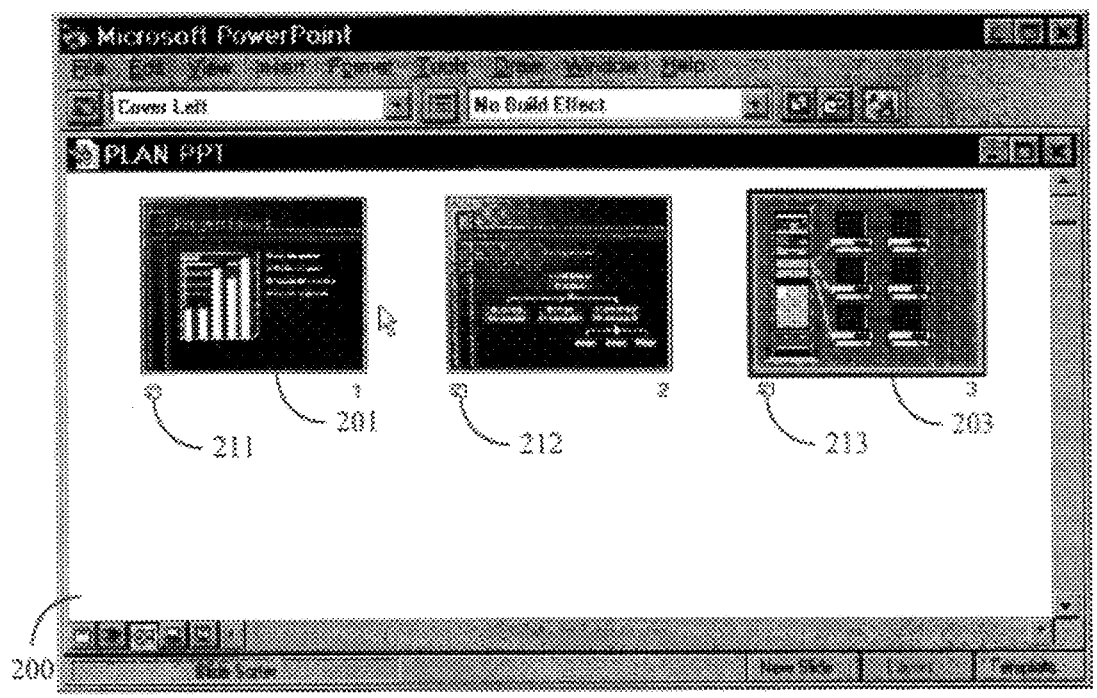

After the assignment of the "Cover Left" transition effect to the pair of images comprising image 202 and image 203, the previewing program preferably automatically previews this transition effect. As shown in FIG. 2B, the target image, 203 (FIG. 2A), is temporarily replaced with the source image 202. The previewing program then applies the assigned transition effect to the temporarily displayed source image to progressively transform it back into the target image. FIGS. 2B, 2C, and 2D each show this effect in a further stage of progression. In the case of the "Cover Left" transition effect assigned to images 202 and 203, the previewing program replaces each column of pixels of the displayed target image with the corresponding column of pixels of the target image, from the right-most column to the Left-most column. As can be seen from FIG. 2E, the previewing program also displays transition effect icon 213 to indicate that a transition effect has been assigned to images 202 and 203.

Figure 2F:
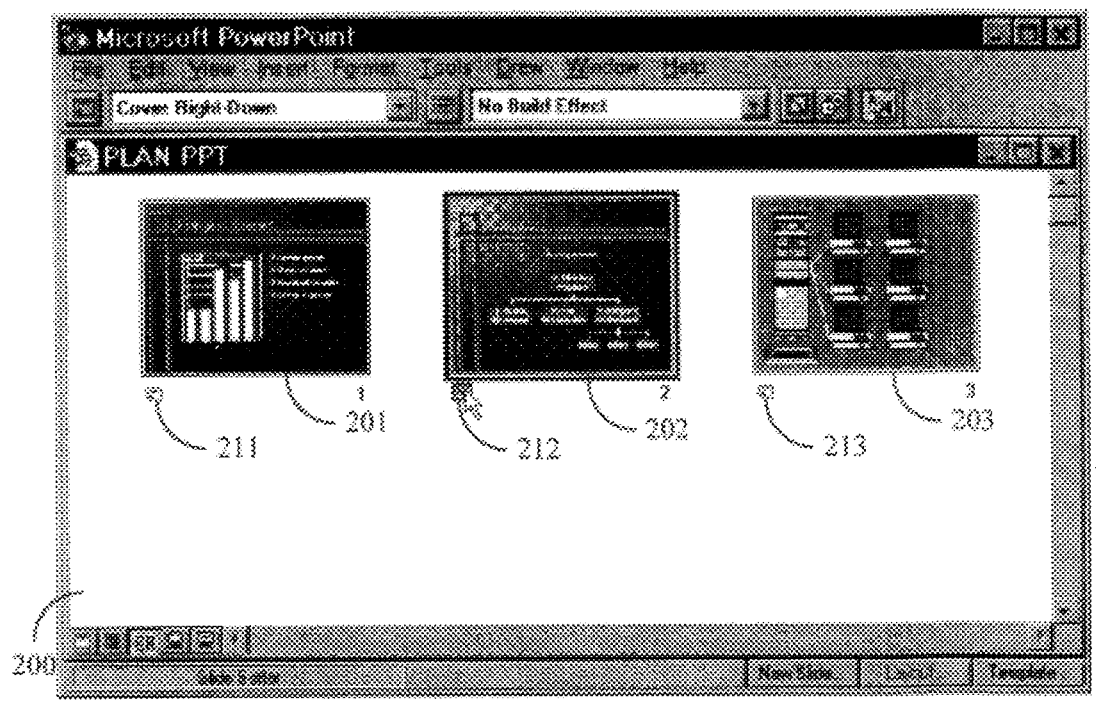
Figure 2G:
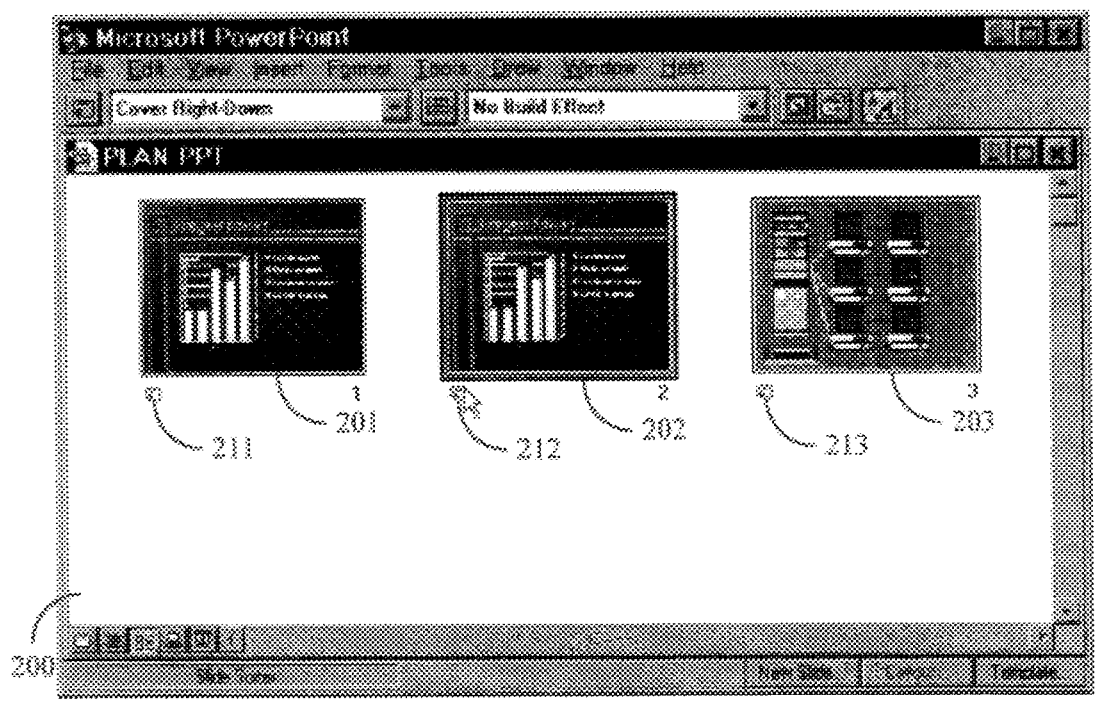
Figure 2H:
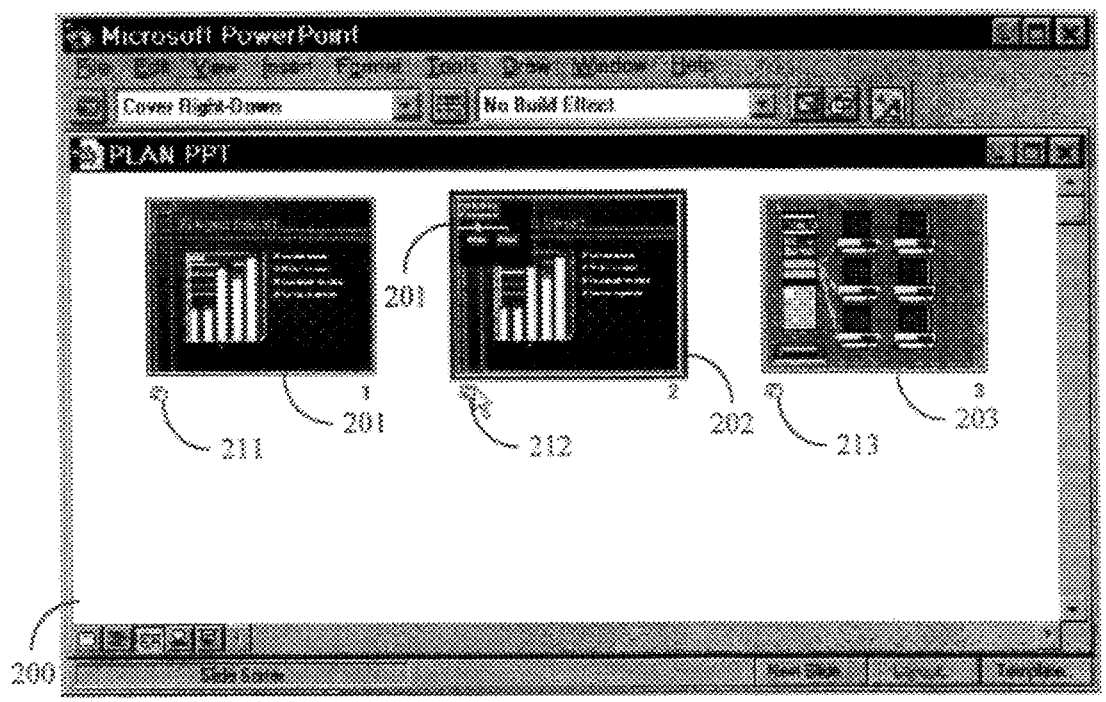
Figure 21:
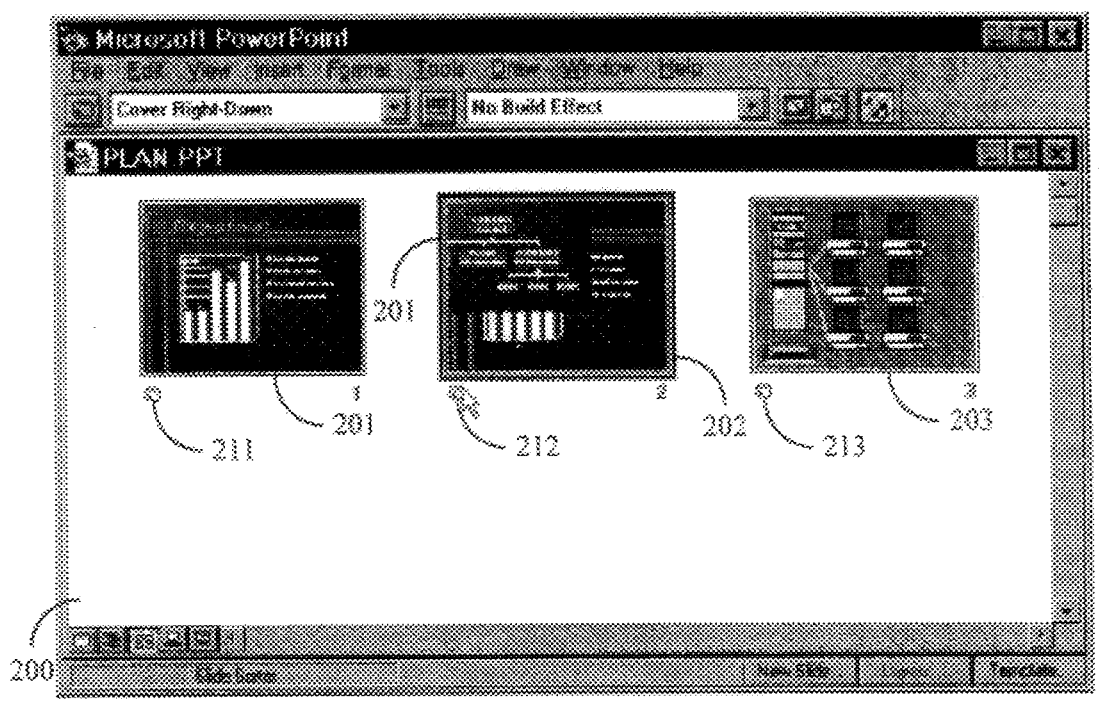
Figure 2J:
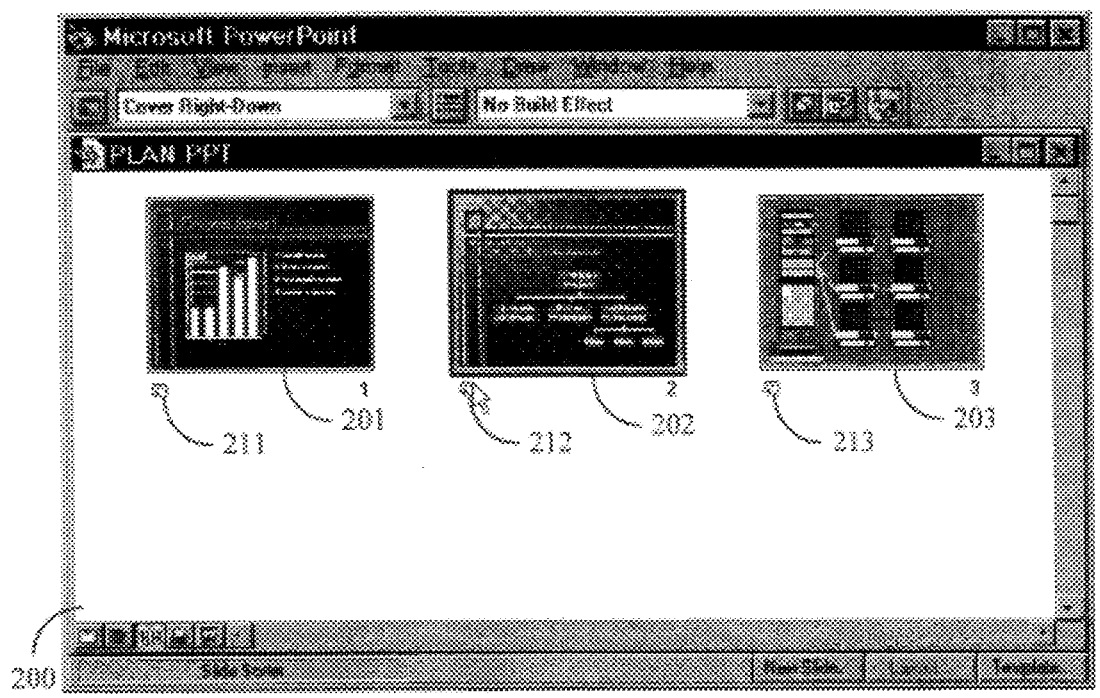

FIGS. 2F–2J show the user previewing a transition effect by selecting a transition effect icon. In FIG. 2F, the user selects transition effect icon 212 by using the mouse to click at a position within the transition effect icon, in order to preview the transition effect assigned to images 201 and 202. As shown by FIG. 2G, the previewing program first temporarily replaces the target image 202 with the source image 201. The facility then applies the transition effect assigned to images 201 and 202 to progressively transform the source image temporarily displayed in place of the target image with the target image. FIGS. 2H, 2I, and 2J each show this effect in a further stage of progression. The "Cover Right-Down" transition effect assigned to images 201 and 202 displays progressively larger rectangular sections of the target image that contain its lower right-hand corner in the upper left-hand corner of the source image, until the entire target image is displayed there and "covers" the source image.

Figure 3:
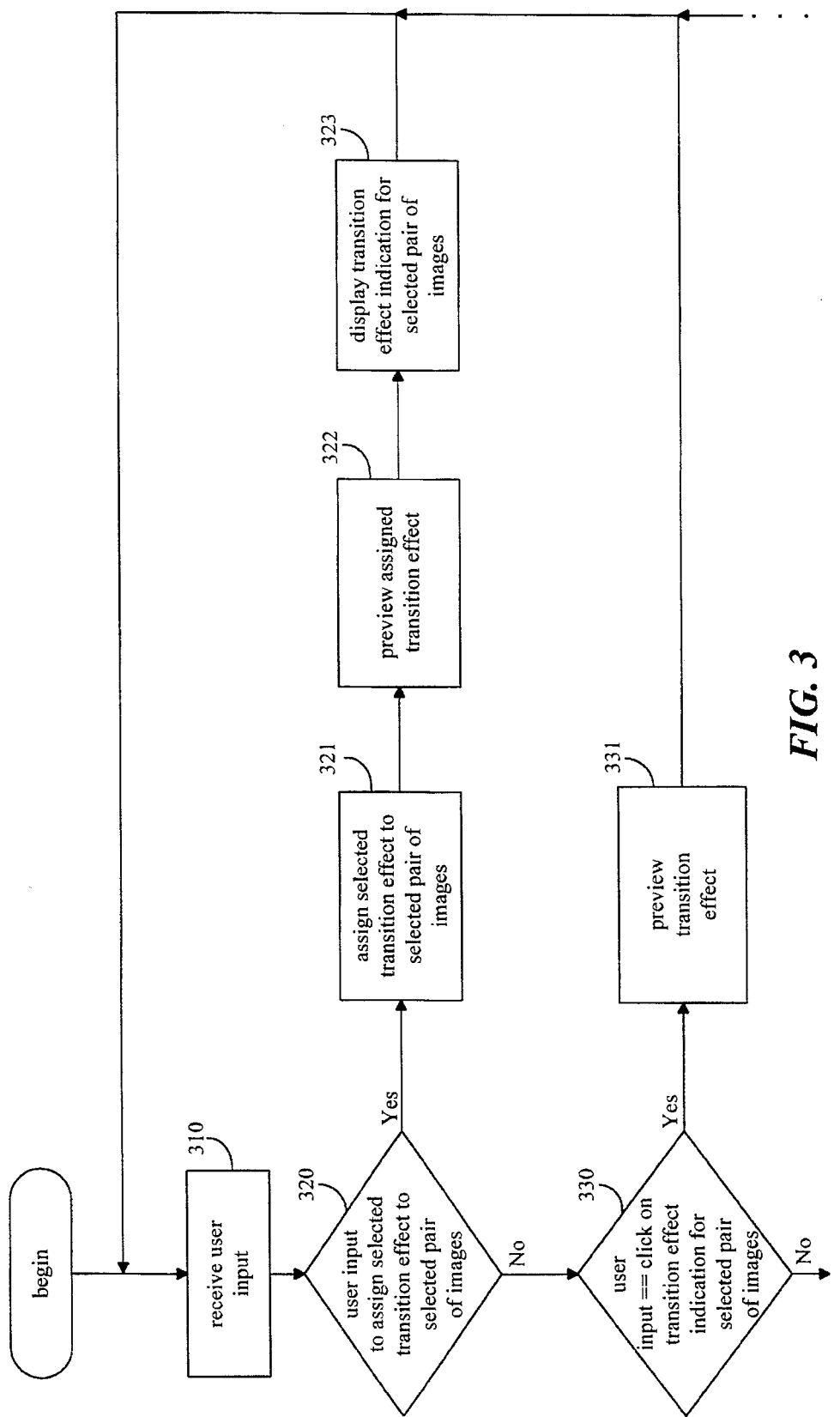
FIG. 3 is an overview flow diagram showing the steps performed by the preview program.
Figure 4:
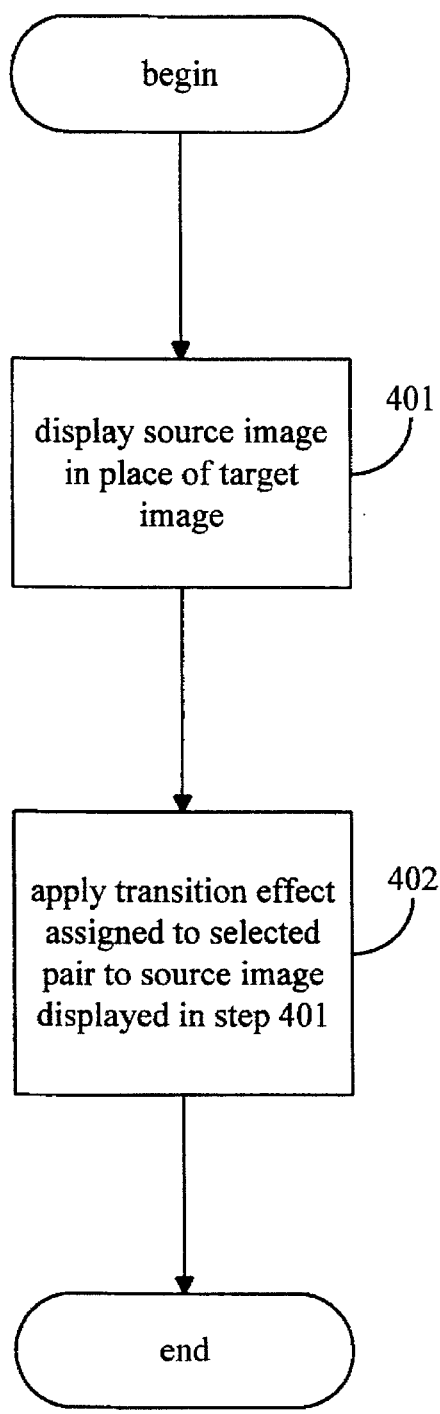
FIG. 4 is a flow diagram showing the steps performed by the preview program in order to preview a transition effect.
Figure 5:
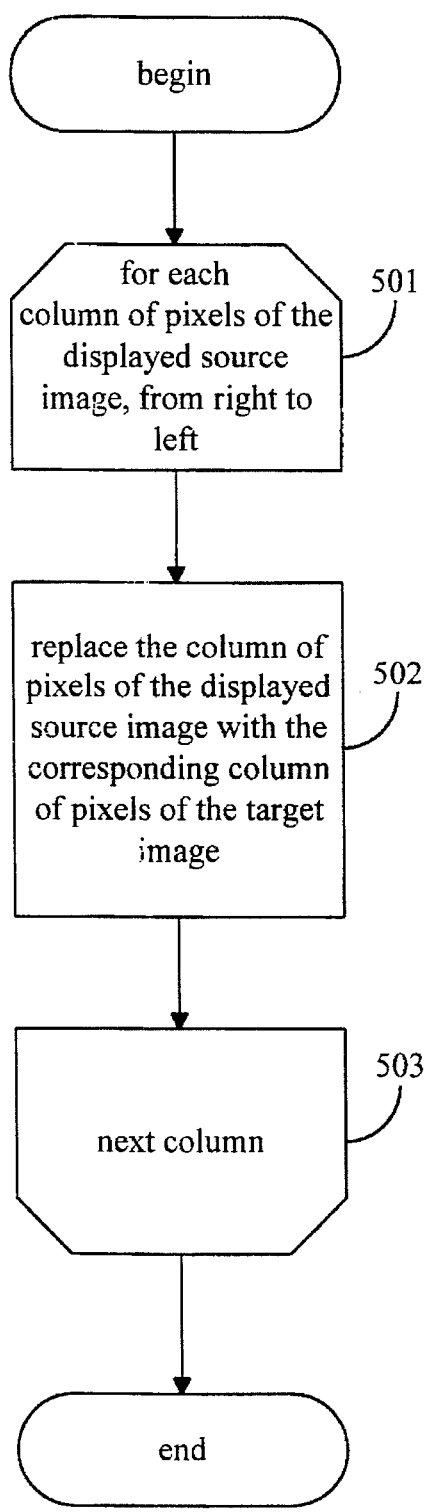
FIG. 5 is a flow diagram showing the steps performed by the preview program in order to apply a sample transition effect.

FIGS. 3–5 are flow diagrams showing the steps performed by the previewing program. FIG. 3 is an overview flow diagram showing the steps performed by the preview program. As is generally true of event-driven programs, the previewing program is preferably organized as a user input processing loop. While the user input processing loop of the previewing program is preferably much more extensive than is shown in FIG. 3 in order to provide the full functionality of a state-of-the-art presentation program, only the portion of the previewing program's user input processing loop that is directly relevant to the present invention is shown. In step 310, the previewing program receives an instance of user input, such as a mouse click or a key press. In step 320, if the user input received a step 310 constitutes an instruction to assign a selected transition effect to a selected pair of images, such as interaction with the drop-down list box 250 shown in FIG. 2A, then the previewing program continues at steps 321–323 to assign and preview the selected transition effect, else the previewing program continues at step 330. In step 321, the previewing program assigns the selected transition effect to the selected pair of images. In step 322, the previewing program previews the assigned transition effect as shown in FIGS. 2B–2D and 2G–2J. Step 322 (along with identical step 331, discussed below) is discussed in greater detail below in conjunction with FIG. 4. In step 323, the previewing program displays a visual transition effect indication, or transition effect icon, in conjunction with the selected pair of images. More particularly, the previewing program preferably displays the transition effect icon beneath the target image of the selected pair of images. After step 323, the previewing program continues at step 310 to receive the next instance of user input.

In step 330, if the user input received in step 310 was a mouse click at a position within the transition effect indication for a selected pair of images, then the previewing program continues at step 331, else the previewing program continues to process other types of user input (not shown). In step 331, the previewing program previews the transition effect assigned to the selected pair of images as shown in FIGS. 2B–2E and 2G–2J. After step 331, the previewing program continues at step 310 to receive the next instance of user input.

FIG. 4 is a flow diagram showing the steps performed by the preview program in order to preview a transition effect. In step 401, the previewing program displays the source image in place of the target image, as shown in FIG. 2B. In step 402, the previewing program applies the transition effect assigned to the selected pair of images to the source image displayed in step 401. Step 402 is discussed with respect to a sample transition effect below in conjunction with FIG. 5. These steps then conclude.

FIG. 5 is a flow diagram showing the steps performed by the preview program in order to apply a sample transition effect. The steps shown are those performed by the previewing program in order to apply the "Cover Left" transition effect shown previously in FIGS. 2B–2E. In steps 501–503, the previewing program loops through each column of pixels comprising the bitmap of the source image from the right-most column to the left-most column. Step 501 marks the beginning of this loop, and step 503 the end. These "loop limit" symbols are discussed on page 6 of ANSI/ISO, 5807–1985, a standard for, among other things, symbols and conventions for program flowcharts promulgated by the International Standards Organization and adopted by the American National Standards Institute. In step 502, within the loop, the previewing program replaces the current column of pixels of the displayed source bitmap image with the corresponding column of pixels of the target bitmap image. In step 603, the previewing program repeats step 502 for the next column of pixels of the source image, if any remain. These steps then conclude.

While this invention has been shown and described with reference to preferred embodiments, it will be understood by those skilled in the art that various changes or modifications in form and detail may be made without departing from the scope of the invention. For example, virtually any type of transition effect for visually transforming a source image into a target image could be employed by the previewing program.

I claim:

1. A method in a computer program for designing a presentation comprising an ordered series of images, the method for previewing in a display area of a display device a transition effect to a target image from a source image which immediately precedes the target image in the ordered series of images, comprising the steps of:

simultaneously displaying in the display area a plurality of the images of the presentation;

selecting one of the displayed images as the target image;

in response to input from a user, assigning one of a plurality of transition effects to the target image; and in response to assigning the transition effect to the selected image, and irrespective of further user input:
   displaying the source image in place of the target image, and
   applying the assigned transition effect to the source image displayed in place of the target image to transform the source image displayed in place of the target image into the target image.

2. The method of claim 1 wherein the step of displaying a plurality of the images includes the step of displaying a plurality of the images of the presentation that are contiguous in the ordered series of images.

3. A method in a computer program for designing a presentation comprising an ordered series of images, each of the images either having a transition effect type specifying how the image immediately preceding the image in the ordered series of images is to be transformed into the image in a presentation mode or having no transition effect type, the method for previewing in a display area of a display device a transition effect to a target image from a source image which immediately precedes the target image in the ordered series of images based upon input from a pointing input device, comprising the steps of:

simultaneously displaying in the display area a plurality of the images of the presentation;

displaying in conjunction with each displayed image having a transition effect type a visual indication that the image has a transition effect type; and in response to the selection of one of the displayed indications by a user using the pointing input device, and irrespective of further user input:
   selecting as the target image the image whose displayed indication was selected by the user,
   displaying in place of the target image the source image immediately preceding the target image in the ordered series of images, and
   applying the transition effect type of the target image to the source image displayed in place of the target image to transform the source image displayed in place of the target image into the target image.

4. The method of claim 3 wherein the step of displaying a plurality of the images includes the step of displaying a plurality of the images of the presentation that are contiguous in the ordered series of images.

5. A method in a computer program for designing a presentation comprising a plurality of images, the method for previewing in a display area of a display device a selected transition effect that visually transforms a source image among the plurality of images to a target image among the plurality of images, comprising the steps of:

(a) simultaneously displaying in the display area both the source image and the target image;

(b) receiving a transition effect preview request from a user; and (c) in response to receiving a transition effect preview request:
   (1) displaying the source image in place of the target image in the display area, and (2) applying the selected transition effect to the source image displayed in step (c)(1) to visually transform the source displayed in step (c)(1) into the target image.

6. A method in a computer program for designing a presentation comprising a plurality of images, the method for previewing in a display area of a display device a selected transition effect that visually transforms a source image among the plurality of images to a target image among the plurality of images, comprising the steps of:

simultaneously displaying in the display area the source image in a first position and the target image in a second position;

receiving a transition effect preview request from a user; and in response to receiving a transition effect preview request:

applying the selected transition effect to the source image to visually transform the source image displayed in the first position into the target image, and after applying the selected transition effect, redisplaying the source image in the first position.

7. A method in a computer program for designing a presentation comprising an ordered series of images, the method for previewing in a display area of a display device a transition effect between a consecutive pair of the images, comprising the steps of:

simultaneously displaying in the display area a plurality of the images of the presentation;

selecting a consecutive pair of the displayed images, the selected pair of images comprising a first selected image and a second selected image;

in response to input from a user, assigning one of a plurality of transition effects to the selected pair of images; and in response to assigning the transition effect to the selected pair of images, and irrespective of further user input:

displaying the first selected image in place of the second selected image, and applying the assigned transition effect to the first selected image displayed in place of the second selected image to transform the first selected image displayed in place of the second selected image into the second selected image.

8. A method in a computer program for designing a presentation comprising an ordered series of images, each consecutive pair of the images comprising a first image and a second image either having a transition effect type specifying how the first image of the pair is to be visually transformed into the second image of the pair in a presentation mode or having no transition effect type, the method for previewing in a display area of a display device a transition effect to the second image of a selected pair from the first image of the selected pair based upon input from a pointing input device, comprising the steps of:

simultaneously displaying in the display area a plurality of the images of the presentation comprising one or more consecutive pairs of images;

displaying in conjunction with each displayed consecutive pair of images having a transition effect type a visual indication that the pair has a transition effect type; and in response to the selection of one of the displayed indications by a user using the pointing input device, and irrespective of further user input:

selecting the pair of images whose displayed indication was selected by the user, displaying the first image of the selected pair of images in place of the second image of the selected pair of images, and applying the transition effect of the selected pair of images to the first image of the selected pair of images displayed in place of the second image of the selected pair of images to transform the first image of the selected pair of images displayed in place of the second image of the selected pair of images into the second image of the selected pair of images.

9. A method in a computer program for designing a presentation comprising an ordered series of images, the method for previewing in a display area of a display device a transition effect to a selected image from an image which immediately precedes the selected image in the ordered series of images, comprising the steps of:

simultaneously displaying in the display area a plurality of the images of the presentation;

in response to input from a user, assigning a selected one of a plurality of transition effects to a selected one of the displayed images; and in response to assigning the selected transition effect to the selected image, and irrespective of further user input:

displaying in place of the selected image a preceding image that immediately precedes the target image in the ordered series of images, and applying the assigned transition effect to the preceding image displayed in place of the selected image to transform the preceding image displayed in place of the target image into the selected image.

10. The method of claim 9 wherein the applying step includes the steps of replacing portions of the displayed preceding image with corresponding portions of the selected image according to a preselected pattern associated with the assigned transition effect until the preceding image has been completely replaced with the selected image.

11. An apparatus for previewing a selected transition effect which visually transforms a source image among a plurality of images comprising a presentation to a target image among the plurality of images, comprising:

a display device having a display area, within which is initially displayed the source image in a first position and the target image in a second position;

a request receiver for receiving a transition effect preview request from a user; and a transition effect preview sequencer that operates in response to the receipt of a transition effect preview request by the request receiver, comprising:

a transition effect previewer for applying the selected transition effect to the source image to visually transform the source image displayed in the display area of the display device in the first position into the target image, and a source image restorer for, after the operation of the transition effect previewer, causing the source image to again be displayed in the display area of the display device in the first position.

12. The apparatus of claim 11, further including:

a transition effect selector that selects a particular transition effect for visually transforming the source image into the target image in response to user input; and a transition effect preview instruction generator that generates a transition effect preview instruction in response to the operation of the transition effect selector.

13. The apparatus of claim 11, further including:

an indication display module for displaying in conjunction with the source image and target image in the display area a visual indication that a particular transition effect has been selected for visually transforming the source image into the target image;

an indication selection monitor that receives user input selecting the visual indication displayed by the indication display module; and a transition effect preview instruction generator that generates a transition effect preview instruction in response to the operation of the indication selection monitor.

14. An apparatus for previewing a selected transition effect which visually transforms a source image among a plurality of images comprising a presentation to a target image among the plurality of images, comprising:

a display device having a display area, within which is initially displayed the source image in a first position and the target image in a second position;

a request receiver for receiving a transition effect preview request from a user; and a transition effect preview sequencer that operates in response to the receipt of a transition effect preview request by the request receiver, comprising:

a source image copier for displaying the source image in the second position of the preview area to replace the target image, and a transition effect previewer for, after the operation of the source image copier, applying the selected transition effect to the source image displayed in the second position of the preview area to visually transform the source image displayed in the second position of the preview area into the target image.

15. The apparatus of claim 14, further including:

a transition effect selector that selects a particular transition effect for visually transforming the source image into the target image in response to user input; and a transition effect preview instruction generator that generates a transition effect preview instruction in response to the operation of the transition effect selector.

16. The apparatus of claim 14, further including:

an indication display module for displaying in conjunction with the source image and target image in the display area a visual indication that a particular transition effect has been selected for visually transforming the source image into the target image;

an indication selection monitor that receives user input selecting the visual indication displayed by the indication display module; and a transition effect preview instruction generator that generates a transition effect preview instruction in response to the operation of the indication selection monitor.

17. A method in a computer system for designing an ordered series of images, each pair of images that are adjacent in the ordered series either having a transition effect type specifying how a first member of the pair is to be visually transformed into a second member of the pair or having no transition effect type, the method comprising the steps of, while simultaneously displaying a plurality of adjacent pairs of images of the series:

(a) displaying in conjunction with each displayed pair of adjacent images having a transition effect type a visual indication that the pair of images has a transition effect type;

(b) receiving user input specifying the selection of the visual indication that a first one of the displayed pairs of images has a transition effect type;

(c) in response to step (b):

(1) displaying the image that is the first member of the first pair in place of the image that is the second member of the first pair, and (2) applying the transition effect type of the first pair to the image that is the first member of the first pair displayed in place of the image that is the second member of the first pair in order to visually transform the image that is the first member of the first pair displayed in place of the image that is the second member of the first pair into the image that is the second member of the first pair; and (d) receiving user input specifying the selection of the visual indication that a second one of the displayed pairs of images has a transition effect type;

(e) in response to step (d):

(1) displaying the image that is the first member of the second pair in place of the image that is the second member of the second pair, and (2) applying the transition effect type of the second pair to the image that is the first member of the second pair displayed in place of the image that is the second member of the second pair in order to visually transform the image that is the first member of the second pair displayed in place of the image that is the second member of the second pair into the image that is the second member of the second pair.

18. A computer-readable medium whose contents cause a computer system to design an ordered series of images by performing the steps of, while simultaneously displaying a plurality of pairs of images that are adjacent in the ordered series:

(a) receiving user input specifying the assignment of a transition effect to a first one of the displayed pairs of adjacent images;

(b) in response to step (a), irrespective of further user input:

(1) displaying the image that is the first member of the first pair in place of the image that is the second member of the first pair, and (2) applying the transition effect type of the first pair to the image that is the first member of the first pair displayed in place of the image that is the second member of the first pair in order to visually transform the image that is the first member of the first pair displayed in place of the image that is the second member of the first pair into the image that is the second member of the first pair; and (c) receiving user input specifying the assignment of a transition effect to a second one of the displayed pairs of adjacent images;

(d) in response to step (c), irrespective of further user input:

(1) displaying the image that is the first member of the second pair in place of the image that is the second member of the second pair, and (2) applying the transition effect type of the second pair to the image that is the first member of the second pair displayed in place of the image that is the second member of the second pair in order to visually transform the image that is the first member of the second pair displayed in place of the image that is the second member of the second pair into the image that is the second member of the second pair.

19. A computer-readable medium whose contents cause a computer system to preview in a display area of a display device of the computer system a selected transition effect that visually transforms a source image among a plurality of images comprising a visual presentation into a target image among the plurality of images comprising the visual presentation by performing the steps of:

(a) simultaneously displaying in the display area both the source image and the target image;

(b) receiving a transition effect preview request from a user; and (c) in response to receiving a transition effect preview request:
  (1) displaying the source image in place of the target image in the display area, and
  (2) applying the selected transition effect to the source image displayed in step (c)(1) to visually transform the source displayed in step (c)(1) into the target image.

* * * * *